(12) United States Patent
Marioni

(10) Patent No.: US 12,289,075 B2
(45) Date of Patent: Apr. 29, 2025

(54) METHOD FOR CONTROLLING THE DIRECTION OF ROTATION OF A FLUID MACHINE AND PROCESSING UNIT CONFIGURED TO PERFORM SAID METHOD

(71) Applicant: ASKOLL HOLDING S.r.l. a socio unico, Dueville (IT)

(72) Inventor: Elio Marioni, Dueville (IT)

(73) Assignee: ASKOLL HOLDING S.r.l. a socio unico, Dueville (IT)

(*) Notice: Subject to any disclaimer, the term of this patent is extended or adjusted under 35 U.S.C. 154(b) by 0 days.

(21) Appl. No.: 17/943,897

(22) Filed: Sep. 13, 2022

(65) Prior Publication Data
US 2023/0090353 A1    Mar. 23, 2023

(30) Foreign Application Priority Data
Sep. 17, 2021  (IT) .................. 102021000023915

(51) Int. Cl.
| | |
|---|---|
| H02P 25/022 | (2016.01) |
| F04D 15/00 | (2006.01) |
| H02P 6/22 | (2006.01) |
| H02P 6/24 | (2006.01) |
| H02P 6/30 | (2016.01) |

(52) U.S. Cl.
CPC .............. *H02P 6/30* (2016.02); *F04D 15/00* (2013.01); *H02P 6/24* (2013.01); *F05D 2270/52* (2013.01); *F05D 2270/62* (2013.01)

(58) Field of Classification Search
CPC ................................ H02P 25/022; H02P 1/46
See application file for complete search history.

(56) References Cited

U.S. PATENT DOCUMENTS

| | | | |
|---|---|---|---|
| 2006/0265890 A1 | 11/2006 | Solan et al. | |
| 2019/0068094 A1* | 2/2019 | Sun ................... | H02P 1/465 |

FOREIGN PATENT DOCUMENTS

| | | | | |
|---|---|---|---|---|
| DE | 102005011731 A1 * | 7/2006 | ............ | H02P 1/465 |
| EP | 2410653 A1 | 1/2012 | | |
| EP | 2439840 A1 | 4/2012 | | |

OTHER PUBLICATIONS

Search Report issued May 17, 2022 in connection with corresponding Italian Patent Application No. 102021000023915.

* cited by examiner

*Primary Examiner* — Kawing Chan
*Assistant Examiner* — Charles S Laughlin
(74) *Attorney, Agent, or Firm* — Akerman LLP

(57) ABSTRACT

A method for controlling the direction of rotation of a fluid machine having an oriented-blade impeller, comprising the following steps:
starting (100) a synchronous electric motor which operates said fluid machine until the synchronous state is reached;
driving (200) said synchronous electric motor at steady state by applying a phase cutting;
applying (300) a phase cutting corresponding to a reference power, wherein said reference power is comprised between a first power required to keep the propeller rotating in a right direction and a second power required to keep the propeller rotating in a wrong direction, which is opposed to the right direction.

9 Claims, 5 Drawing Sheets

METHOD FOR CONTROLLING THE DIRECTION OF ROTATION OF A FLUID MACHINE AND PROCESSING UNIT CONFIGURED TO PERFORM SAID METHOD

CROSS-REFERENCE TO RELATED APPLICATIONS

The present application claims priority to Italian Patent Application No. 102021000023915, filed on Sep. 17, 2021, the entirety of which is incorporated herein by reference.

FIELD OF APPLICATION

In its more general aspect, the present invention relates to a method for controlling the direction of rotation of a fluid machine, as well as to a processing unit specifically arranged for implementing said method.

In a preferred manner, the method is directed to controlling a washing pump or a discharge pump of a household appliance equipped with an oriented impeller, driven by means of a synchronous electric motor.

The technical field of the invention relates to the field of fluid machines, particularly of pumps; specifically, the present invention finds its preferred application in the industrial field of large household appliances, for instance for controlling a washing or discharge pump in washing machines or dishwashing machines.

More generally, the invention may be applied in all those fields where it is necessary to discriminate the direction of rotation of synchronous motors, for instance in the ventilation field.

PRIOR ART

Synchronous electric motors, in particular having permanent magnets, are known in the art, and are currently used in a plurality of applications, including the operation of components and pumps in the field of household appliances. In fact, these motors benefit from a high energy efficiency and excellent speed stability at steady state, in addition to relatively low production costs.

On the other hand, synchronous electric motors, especially of the single-phase type, have known drawbacks related to their start-up phase. In particular, as for the present invention, it should be noted that these machines are bidirectional, namely they can start in an undifferentiated way in one or the other direction of rotation. If this does not entail a problem on electric pumps equipped with radial-blade impellers, which ensure the same performance in both directions of rotation, it is however necessary to introduce mechanical and/or electronic measures when using oriented-blade impellers, which have higher efficiency but must be started in the right direction.

The direction control devices used in the synchronous electric pumps of large household appliances can use a position sensor, ensuring with absolute certainty the fulfillment of the required condition.

However, there are also devices that perform motor control without the use of a position sensor, thus obtaining a lower production cost and avoiding the risk of element failure. For this type of pumps, and for some applications with reduced hydraulic circuit and with low or variable load, a starting in the right direction is not always obtained. In fact, there is a residual number, approximately equal to about 2% of the total, of starts of the motor in a direction opposite the desired one. In these cases, the hydraulic performance of the pump is considerably degraded, in addition to an annoying increase in operating noise.

The improvement of the percentage of right starts, in the current state of knowledge in the field, requires the use of the position sensor. The control electronics, however, are not always equipped with said sensor since, as previously discussed, it has an additional cost to be taken into consideration.

The above exposed considerations for the pumps of household appliances similarly apply to other fluid machines controlled by synchronous motors that use oriented blade-impellers, as it occurs for instance in the ventilation field.

Therefore, the technical problem underlying the present invention is to provide a method for controlling the direction of rotation of a fluid machine that ensures better results without entailing a significant increase in production costs.

SUMMARY OF THE INVENTION

The above identified technical problem is solved by a method for controlling the direction of rotation of a fluid machine with oriented-blade impeller, comprising the following steps:

starting a synchronous electric motor which operates said fluid machine until the synchronous state is reached;

driving said synchronous electric motor at steady state by applying a phase cutting;

applying a phase cutting corresponding to a reference power, wherein said reference power is comprised between a first power required to keep the impeller of the fluid machine rotating in a right direction and a second power required to keep the impeller of the fluid machine rotating in a wrong direction, which is opposed to the right direction.

Basically, the present invention suggests a change of perspective with respect to the prior art systems, with which it can still be combined. In fact, if in the prior art an attempt is made to always ensure the motor starts in the desired direction, the present invention instead suggests a verification of the actual direction of rotation applied immediately following the starting.

The use of the phase cutting, already present in the motors of this type, is particularly advantageous since it allows performing the verification of the direction of rotation by forcing the cutting at a predefined value for a short time.

Preferably, the phase cutting corresponding to the reference power is in fact applied for a limited period of time, with the sole purpose of verifying the right rotation of the motor and causing, if not, the loss of synchronism.

In particular, the phase cutting corresponding to the reference power may be a constant phase cutting which uses a reference phase angle.

Said predefined phase angle may derive from theoretical interpolations or, preferably, from experimental results.

It is noted that a verification of the power absorbed by the motor, to evaluate the direction of rotation of the impeller, would involve the use of a wattmeter that usually is not present on the control boards of the pumps for household appliances.

The measurement of the phase current, which is also possible, would however be less accurate given the range in the supply voltage and the tolerances of the components that make up the fluid machine, and would risk not to lead to reliable results.

Preferably, the motor used in the method according to the invention is a single-phase or two-phase synchronous electric motor controlled by TRIAC.

Still preferably, the synchronous motor used is of the permanent magnet type.

Preferably, in the phase of driving said synchronous electric motor at steady state by applying a phase cutting, the phase angle is feedback-controlled in order to work in an optimum energy state.

A method for the optimization of the phase cutting, already disclosed in other patents to the applicant such as for instance the granted European patents no. EP 2 410 653 and no. EP 2 439 840 integrated for reference in the present application, may provide for instance the feedback-control of said phase angle in order to cancel the phase displacement between the midpoint of a zero current plateau of a function of phase current supplied to the electric motor and the zero-crossing point of a counter electromotive force signal relating to the same phase.

Preferably, the fluid machine is the washing pump or the discharge pump of a household appliance such as a washing machine or a dishwashing machine. In any case, it is noted that the invention may be similarly applied to fluid machines of another kind, as long as they use a synchronous motor and move an oriented-blade impeller; for instance, it can be used in the ventilation field.

As previously mentioned, the phase of applying a phase cutting corresponding to a reference power leads to the loss of synchronism of the electric motor when the fluid machine rotates in the wrong direction; in this case the method provides a phase of restarting the electric motor.

The previously identified technical problem is also solved by a processing unit for controlling a fluid machine, said processing unit being arranged to control at least one power supply switch of a synchronous electric motor which operates said fluid machine by implementing the previously described control method. In a per se known manner, the unit controls a single switch in the case of a single-phase electric motor, but it controls two switches in the case of a two-phase electric motor.

Further features and advantages of the present invention will become apparent from the following description of an exemplifying preferred embodiment given by way of non-limiting example with reference to the appended drawings.

DETAILED DESCRIPTION

Figure 1:
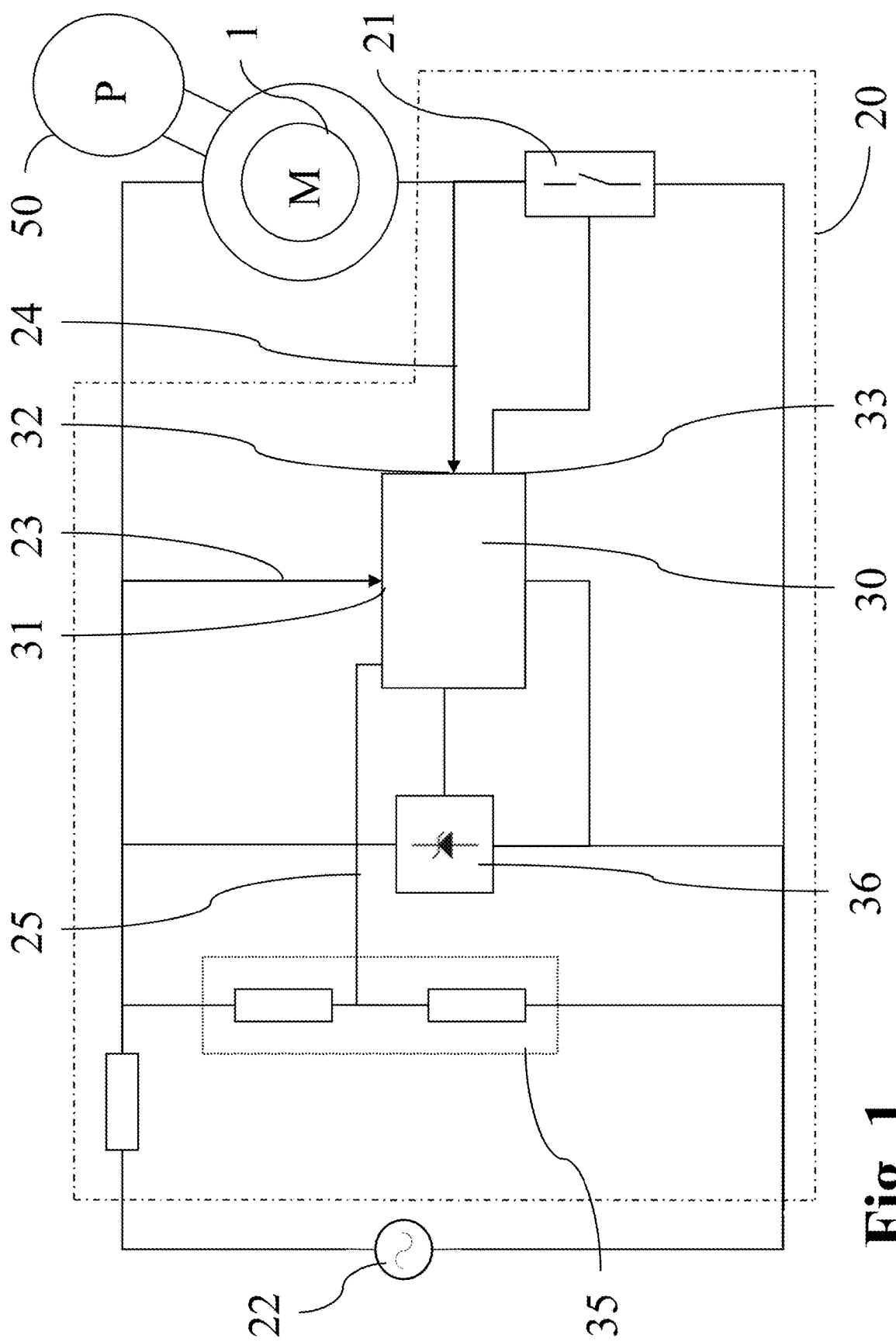
FIG. 1 schematically represents an electronic device associated with a motor-washing pump assembly, said electronic device comprising a processing unit according to the present invention.

With reference to the enclosed FIG. 1, reference number 50 identifies a washing pump of a household appliance, in particular of a washing machine or a dishwashing machine (not represented in the appended figures). The pump 50, in a per se known manner, allows the supply and/or recirculation of the washing water within a washing chamber.

The present preferred application embodiment should be understood by way of example and does not exclude the use of the invention on other fluid machines of different types and/or with a different function.

The pump 50 used in the present invention has an oriented-blade impeller. The oriented-blade impellers, per se known in the field, have a curvature of the blades with respect to the radius of the impeller itself. A preferential direction of rotation of the impeller, in the direction of the convexity of the impeller blades, is thus defined. This preferential direction ensures significantly better hydraulic performance of the impeller. In the present application, reference is made to the preferential direction of rotation as the right direction, whereas the opposite direction is identified as the wrong direction.

The pump 50 is operated by means of an electric motor 1 of the synchronous type; preferably, in the present invention, a single-phase permanent-magnet synchronous motor is used.

An electronic device 20, which preferably takes the form of a control board, is associated with the electric motor 1 and is arranged to drive it by means of phase cutting.

Said electronic device 20 comprises a static switch 21, in this specific case a TRIAC switch, arranged for the cutting of the current supplied by an electrical network 22 in alternating current and directed to the power supply windings of the electric motor 1.

The TRIAC switch 21 is connected to an output 33 of a processing unit 30, which preferably takes the form of a microprocessor.

The electronic device 20 may have a synchronization portion with the network 35 which sends a network synchronism signal 25 to the processing unit 30; the control of the output 33 may be synchronized with said network synchronism signal.

Moreover, the electronic device 20 has a power supply portion 36 of the processing unit, also arranged to provide said unit with a reference signal for the voltage.

The processing unit 30 has a first inlet 31, which receives a mains voltage signal 23, and a second inlet 32, which instead receives a voltage signal across the switch 24.

By processing said signals, the processing unit 30 is able to carry out an indirect measurement of the counter-electromotive force generated by the synchronous motor 1, obtained as the difference between the mains voltage signal 23 and the voltage signal on the switch 24, at times when the current is zero. The processing unit 30 detects said zero current condition still evaluating the voltage signal across the switch 24, and in particular making sure that this signal sufficiently deviates from the zero value.

The electronic device 20, which in FIG. 1 is illustrated in the specific case of driving a single-phase synchronous motor 1, may be differently arranged to drive a two-phase synchronous motor, in which case there will obviously be two switches to modulate the power supply on the two phases.

The method according to the invention, hereinafter described in detail in a preferred embodiment thereof, may be implemented in the same way both in the case of a single-phase motor and in the case of a two-phase motor.

The above electronic device 20 is able to start the electric motor 1 in a per se known manner, bringing it to a synchronism speed. This starting phase is identified with reference number 100 in the flow chart of FIG. 2.

It is noted that known measures of the mechanical and electronic type may be implemented to condition the motor starting as much as possible so that, most of the time, the impeller starts in the right direction of rotation.

Once the synchronism speed has been reached, the electronic device 20 is arranged to drive the electric motor 1 by means of phase cutting, namely by varying the phase angle α which determines the switch-on delay of the TRIAC switch with respect to the change in the sign of the mains current.

Figure 2:
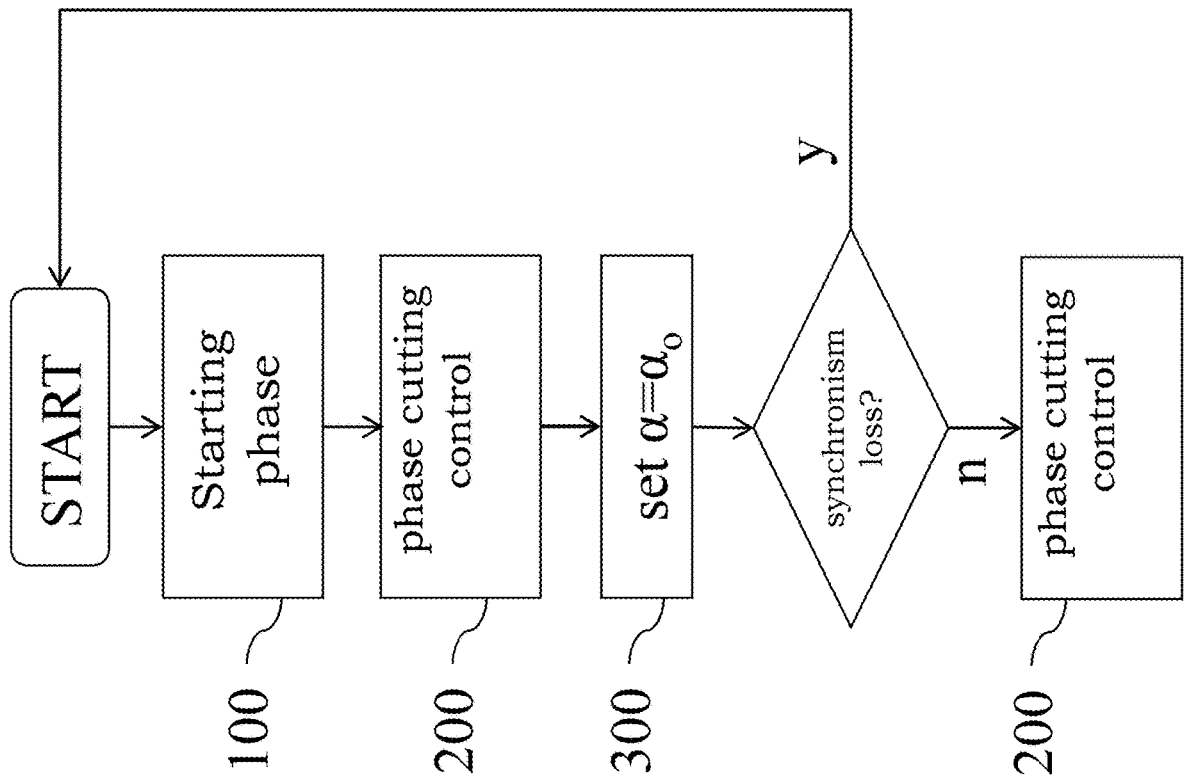
FIG. 2 represents a block diagram briefly illustrating the several phases of the method according to the present invention.

In this driving phase, identified with reference number 200 in FIG. 2, the phase angle α is feedback-controlled, in order to optimize the energy performance of the electric motor 1.

Specifically, the feedback-control occurs by identifying, as an ideal operating condition for the motor, the zero-crossing point of the electromotive force function at a midpoint of the zero current plateau imposed by the closing of the TRIAC switch 21. Obviously, the extension of the zero current plateau and the relative position of its midpoint depend on the value of the phase angle α used for each half-period of current.

The pursued condition corresponds to canceling the phase displacement between the power supply current of the windings and the counter-electromotive force generated by the synchronous motor 1, a condition which, as it is known, ensures the optimization of the energy efficiency of the synchronous motor itself (neglecting the losses in the iron).

Thanks to the counter-electromotive force signal processed therein according to the above described modalities, the processing unit 30 is able to evaluate how the behavior of the motor deviates with respect to the ideal operating condition, consequently feedback-correcting the phase angle α of the TRIAC switch 21.

According to the present invention, the driving of the pump 50 with phase cutting according to the above described modalities is forced, shortly after the starting, by imposing a constant cutting or a reference phase angle $α_0$. Said phase angle $α_0$ is advantageously selected, based on the experimental results hereinafter discussed, so as to cause the loss of synchronism of the electric motor 1 should the impeller be rotating in the wrong direction of rotation; conversely, the power supplied remains sufficient to sustain the rotation of the impeller in the correct direction of rotation. Therefore, this phase, identified with reference number 300 in FIG. 2, performs a test on the direction of rotation, and causes the motor to stop in the event of a wrong starting.

When the electric motor 1 loses synchronism in case of a wrong stating, a new starting phase 100 is thus performed. Instead, if the electric motor 1 does not lose synchronism, which indicates a right direction of rotation, the normal phase cutting 200 is restored and no more tests on the direction of rotation are performed until the next starting.

The identification of the reference phase angle Go, which allows discriminating between rotation in the right direction and rotation in the wrong direction, is possible due to the fact that the hydraulic performance of the impeller is significantly different in the two directions of rotation.

Figure 3:
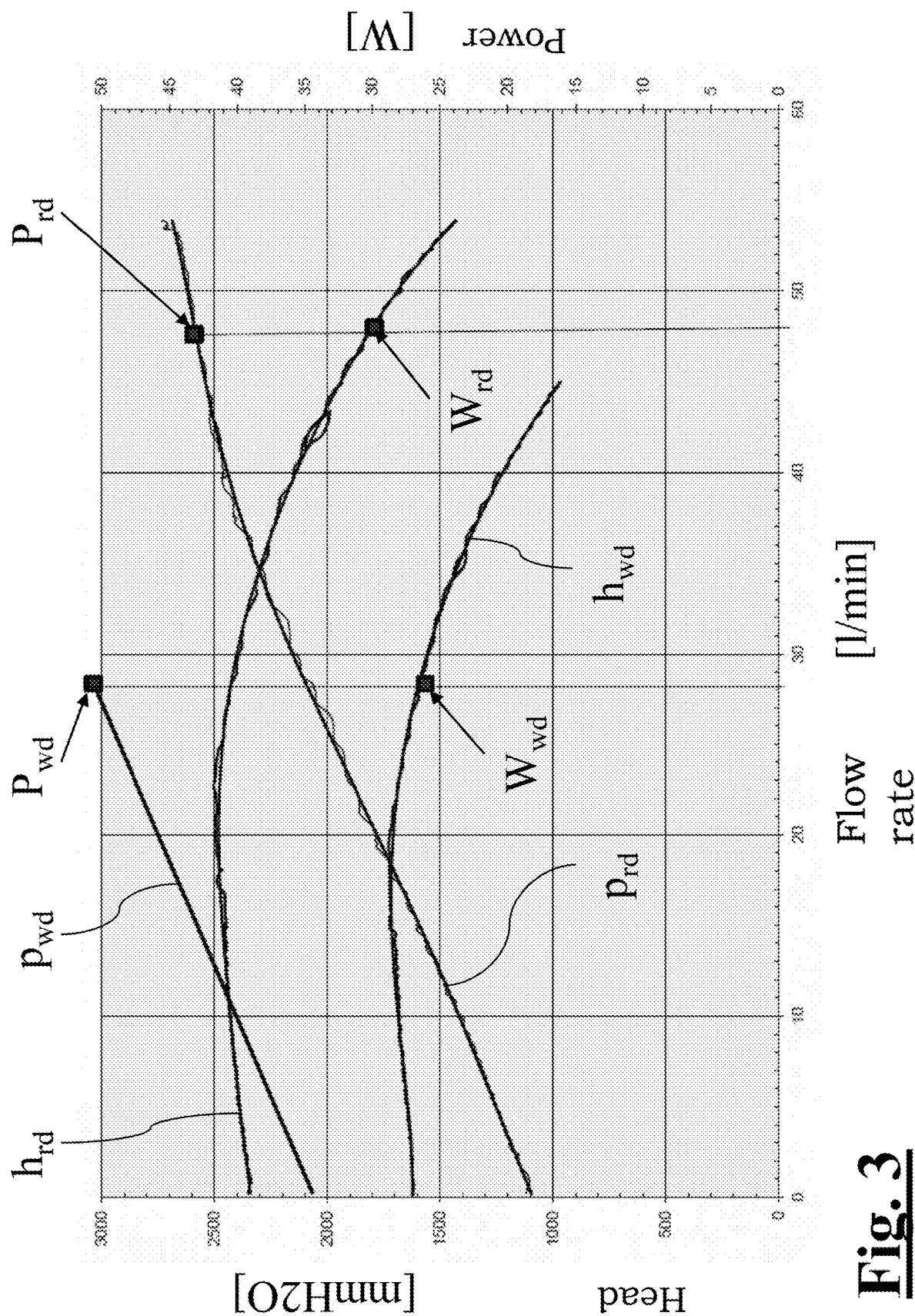
FIG. 3 represents the flow-head curves and the power curves for the pump of the motor-pump assembly of FIG. 1, both in the case of right direction of rotation of the oriented-blade impeller and in the case of wrong direction of rotation.
Figure 4:
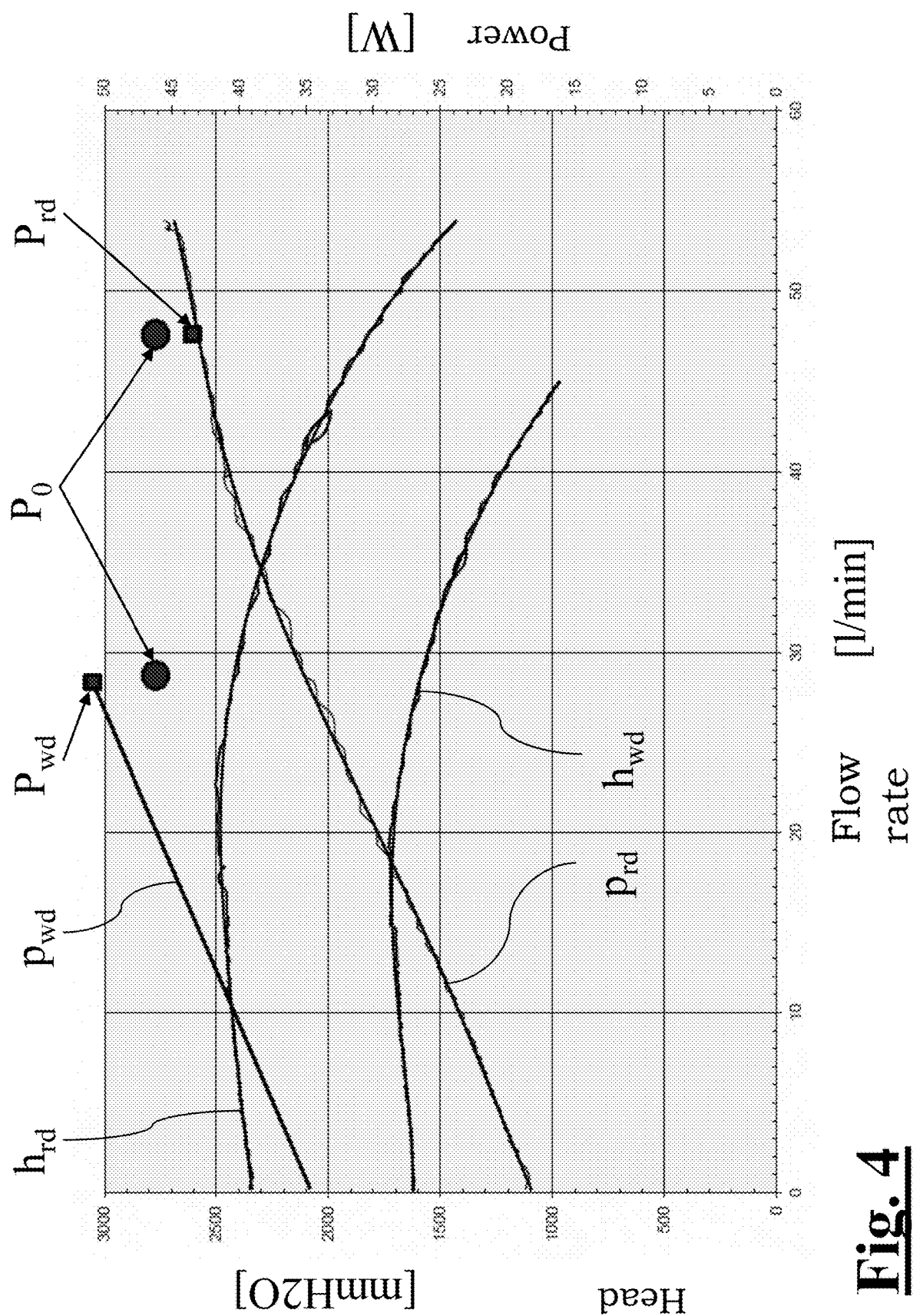
FIG. 4 reproduces the curves of FIG. 3 further identifying a reference power used in the method for the present invention to discriminate between direct or reverse rotation of the impeller.

In FIGS. 3 and 4 the flow rate-head curves illustrating the hydraulic circuit on which the pump 50 works are shown: the curve $h_{rd}$ relates to the operation with the impeller in the right direction of rotation, whereas the curve $h_{wd}$ relates to the operation with the impeller in the wrong direction of rotation. In the figures the powers absorbed by the pump 50 with the right $p_{rd}$ and wrong $p_{wd}$ directions of rotation are also graphed.

As it can be immediately seen, the hydraulic performance of the pump 50 deteriorates significantly when the pump works in the wrong direction: indeed, the work point $W_{wd}$ corresponds to a significantly lower flow rate than that of the work point $W_{rd}$ with rotation in the right direction. Moreover, the power absorbed by the pump working in the wrong direction $P_{wd}$ is significantly higher than the pump working in the right direction $P_{rd}$.

As shown in FIG. 4, it is therefore possible to identify a reference power $P_0$ that is higher than that absorbed by the pump 50 in the right configuration but less than that absorbed by the pump 50 in the wrong configuration. In the exemplifying embodiment which the proposed graphs refer to, the power absorbed by the pump with right rotation $P_{rd}$ is equal to about 42 W, the power absorbed by the pump with wrong rotation $P_{wd}$ is equal to about 53 W and the reference power $P_0$ selected stands at 47 W.

As previously suggested, the above reference power $P_0$ may be supplied by applying a constant and predefined cutting, in particular based on the above reference phase angle $α_0$, which depending on the mains voltage that powers the household appliance (100 V in the examples herein considered) will correspond to the desired power.

Figure 5:
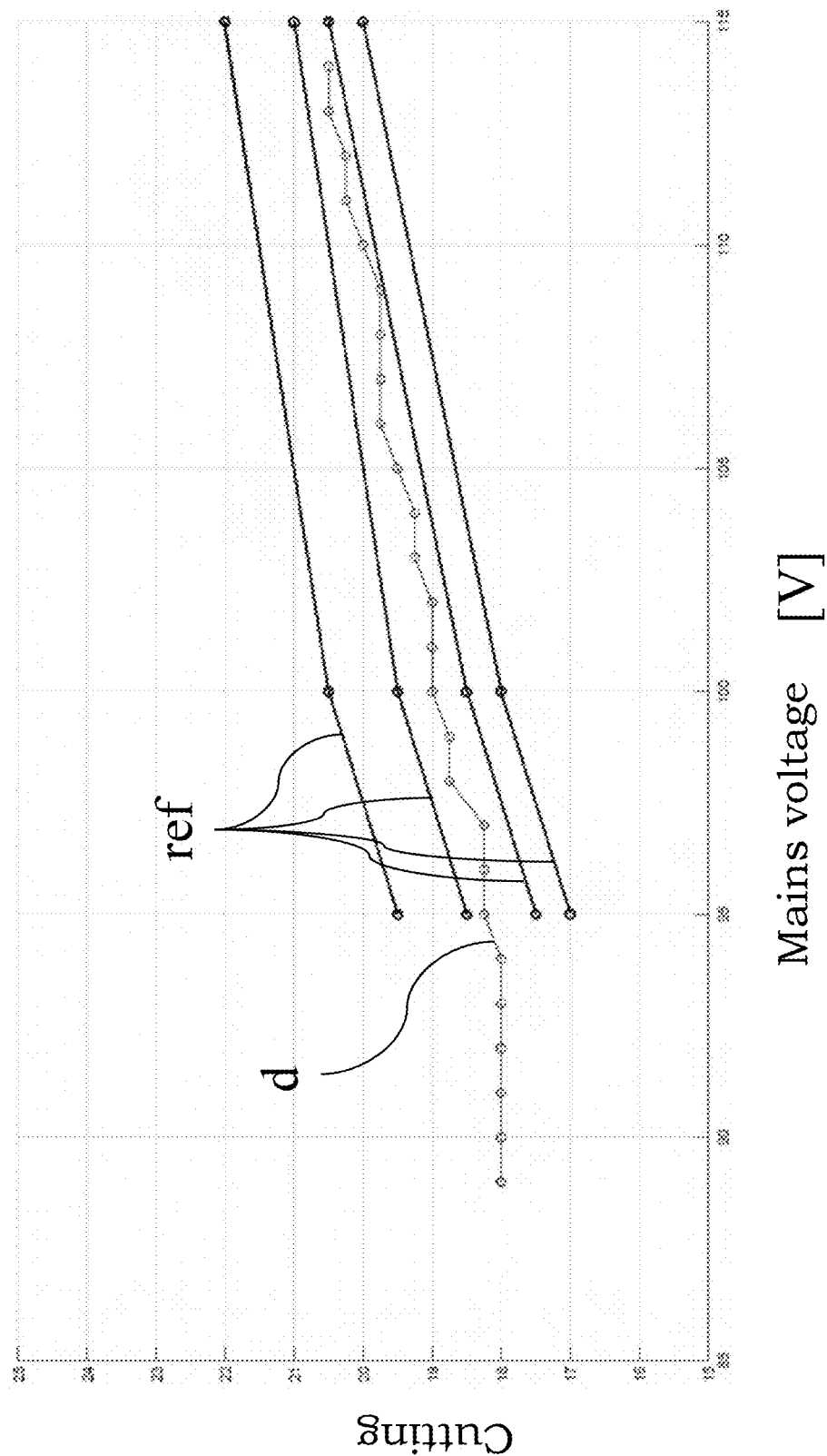
FIG. 5 identifies experimental data of the cutting time as a function of the mains voltage applied to the motor-pump assembly in FIG. 1 during the direction of rotation verification test, in comparison with the reference curves.

The value of the reference phase angle Go may be identified by means of experimental tests by using, for instance, the above driving algorithm with variable cutting and by verifying which cutting percentage is applied to the different mains voltages. Such experimental data d are shown in FIG. 5, where they are graphed in comparison with some reference curves ref in the nominal and very bad cases with low and high temperature water.

The previously described method and processing unit have the advantage of allowing an identification of the impeller starting in a non-optimal direction, using the components currently present on the washing/discharge pumps or other fluid machines, without additional production costs.

The application of the method allows immediately avoiding starting in the wrong direction, already reduced in number thanks to the implementation of the mechanical and electronic measures known in the art.

Another advantage derives from the fact that the method may be performed in a sensorless mode.

It is noted that, in order to discriminate between the two directions of rotation of the impeller, direct measurement of power by means of a wattmeter would be alternatively possible, but it should be noted that this component is not generally present in the control boards of the washing/discharge pumps and would therefore represent an additional burden to be considered in the production costs.

The measurement of the phase current, which is also possible, however would be less accurate given the range in the supply voltage and the tolerances of the components that make up the fluid machine and would risk not to lead to reliable results.

Obviously, a skilled person can make several changes and variants to the method and processing unit, in order to meet contingent and specific needs, all of them by the way contained in the scope of protection of the invention as defined by the following claims.

The invention claimed is:
1. A method for controlling the direction of rotation of a fluid machine having an oriented-blade impeller, comprising the following steps:

starting a synchronous electric motor which operates said fluid machine until a synchronous state is reached;

driving said synchronous electric motor at steady state by applying a first phase cutting so that, in feeding a mains current to the synchronous electric motor, a first switch-on delay is applied with respect to the change in the sign of the mains current, wherein the first switch-on delay is based on a first phase angle;

applying a second phase cutting, so that, in feeding the mains current to the synchronous electric motor, a second switch-on delay is applied with respect to the change in the sign of the mains current, wherein said second switch-on delay is based on a second phase angle that corresponds to a reference power, wherein said reference power has a value between a value of a first power required to keep the fluid machine rotating in a right direction and a value of a second power required to keep the fluid machine rotating in a wrong direction, which is opposed to the right direction;

wherein the step of applying said second phase cutting leads to a loss of synchronism of the electric motor when the impeller of the fluid machine rotates in the wrong direction, said method thus comprising a step of restarting the electric motor.

2. The method according to claim 1, wherein said second phase angle is a reference phase angle constant over time.

3. The method according to claim 2, wherein said reference phase angle derives from experimental results.

4. The method according to claim 1, wherein said second phase cutting is applied for a limited period.

5. The method according to claim 1, wherein said electric motor is a permanent magnet single-phase or two-phase synchronous electric motor.

6. The method according to claim 1, wherein, in the step of driving said synchronous electric motor at steady state by applying a first phase cutting, said first phase angle is feedback-controlled in order to work in an optimum energy state.

7. The method according to claim 6, wherein, in the step of driving said synchronous electric motor at steady state by applying a first phase cutting, said first phase angle is feedback-controlled in order to cancel the phase displacement between the midpoint of a zero current plateau of a function of the phase current supplied to the electric motor and the zero-crossing point of a counter electromotive force signal relating to the same phase.

8. The method according to claim 1, wherein the fluid machine is the washing or discharge pump of a household appliance such as a washing machine or a dishwashing machine, or a fan of a ventilation system.

9. A processing unit for controlling a fluid machine, said processing unit being arranged to control at least one power supply switch of a synchronous electric motor which operates said fluid machine by implementing the control method according to claim 1.

\* \* \* \* \*